United States Patent
Furui (10) Patent No.: US 9,678,413 B2
(45) Date of Patent: Jun. 13, 2017

(54) PROJECTOR AND CONTROL METHOD FOR THE PROJECTOR

(71) Applicant: SEIKO EPSON CORPORATION, Tokyo (JP)

(72) Inventor: Shiki Furui, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/377,994

(22) PCT Filed: Mar. 6, 2013

(86) PCT No.: PCT/JP2013/001424
§ 371 (c)(1),
(2) Date: Aug. 11, 2014

(87) PCT Pub. No.: WO2013/132853
PCT Pub. Date: Sep. 12, 2013

(65) Prior Publication Data
US 2015/0042964 A1 Feb. 12, 2015

(30) Foreign Application Priority Data
Mar. 7, 2012 (JP) .................. 2012-050118

(51) Int. Cl.
G03B 21/14 (2006.01)
G03B 21/53 (2006.01)
H04N 9/31 (2006.01)

(52) U.S. Cl.
CPC ........... *G03B 21/147* (2013.01); *G03B 21/53* (2013.01); *H04N 9/317* (2013.01); *H04N 9/3185* (2013.01); *H04N 9/3194* (2013.01)

(58) Field of Classification Search
CPC .... H04N 9/3185; H04N 9/3186; G03B 21/28; G03B 21/00
(Continued)

(56) References Cited

U.S. PATENT DOCUMENTS 8,272,748 B2 9/2012 Furui
2002/0164083 A1 11/2002 Song et al.
(Continued)

FOREIGN PATENT DOCUMENTS

CN 1645242 A 7/2005
EP 1 560 429 A2 8/2005
(Continued)

OTHER PUBLICATIONS

International Search Report issued in International Application No. PCT/JP2013/001424 mailed Jun. 17, 2013.

*Primary Examiner* — Steven H Whitesell Gordon
*Assistant Examiner* — Jerry Brooks
(74) *Attorney, Agent, or Firm* — Oliff PLC (57) ABSTRACT

A projector includes a projecting unit including a projection optical system and configured to project an image on a screen SC, a lens driving unit configured to perform focus adjustment for the projection optical system, a trapezoidal-distortion correcting unit configured to perform distortion correction processing for correcting distortion of the image projected by the projecting unit, and a projection control unit configured to cause the trapezoidal-distortion correcting unit to execute the distortion correction processing until a completion condition for the distortion correction processing holds after a start condition for the distortion correction processing holds and restrict the execution of the focus adjustment by the lens driving unit while the projection control unit causes the trapezoidal-distortion correcting unit to execute the distortion correction processing.

5 Claims, 6 Drawing Sheets

(58) Field of Classification Search
USPC .......................................................... 353/84
See application file for complete search history.

(56) References Cited

U.S. PATENT DOCUMENTS

| | | |
|---|---|---|
| 2005/0151934 A1 | 7/2005 | Akutsu |
| 2009/0279055 A1* | 11/2009 | Amano .................... G03B 3/00 |
| | | 353/101 |
| 2010/0128031 A1 | 5/2010 | Uoi et al. |
| 2010/0128231 A1* | 5/2010 | Furui ..................... G03B 21/26 |
| | | 353/70 |
| 2010/0315602 A1* | 12/2010 | Takahashi ............ H04N 9/3185 |
| | | 353/70 |
| 2011/0032492 A1* | 2/2011 | Nara .................... H04N 9/3185 |
| | | 353/70 |

FOREIGN PATENT DOCUMENTS

| | | |
|---|---|---|
| JP | 2001-067015 A | 3/2001 |
| JP | 2005-328570 A | 11/2005 |
| JP | A-2010-130225 | 6/2010 |
| JP | A-2010-288062 | 12/2010 |

\* cited by examiner

PROJECTOR AND CONTROL METHOD FOR THE PROJECTOR

CROSS REFERENCE TO RELATED APPLICATIONS

The entire disclosure of Japanese Patent Application No. 2012-050118, filed Mar. 7, 2012 is expressly incorporated by reference herein.

TECHNICAL FIELD

The present invention relates to a projector that projects an image on a projection surface and a control method for the projector.

BACKGROUND ART

There has been known a projector that projects an image on a projection surface, the projector projecting an image for adjustment on the projection surface to photograph the projection surface and performing distortion correction on the basis of a projection state of the image for adjustment. The projector of this type is likely to be unable to accurately detect an image if the image for adjustment is unclear. Therefore, the projector executes focus adjustment prior to the distortion correction (see, for example, PLT 1). For example, an apparatus described in PLT 1 is configured to project an image for focus adjustment and execute a focus on the basis of a projection state of the image. The apparatus uses an image for focus adjustment that can be more promptly detected.

CITATION LIST

Patent Literature

[PTL 1]
JP-A-2010-130225

SUMMARY OF INVENTION

Technical Problem

In general, focus adjustment of a projector is performed by moving an optical system including a lens. Therefore, for an increase in speed, it is necessary to improve a physical mechanism. It is not easy to increase speed. On the other hand, in order to realize improvement of convenience of the projector, it is desired to perform, in a shorter time, a series of processing for correcting distortion.

Solution to Problem

An advantage of some aspects of the invention is to provide a projector that can execute, in a shorter time, processing for correcting distortion of a projected image on a projection surface and a control method for the projector. An aspect of the invention is directed to a projector including: a projecting unit including a projection optical system and configured to project an image on a projection surface; a focus adjusting unit configured to perform focus adjustment for the projection optical system; a correcting unit configured to perform distortion correction processing for correcting distortion of the image projected by the projecting unit; a correction control unit configured to cause the correcting unit to execute the distortion correction processing until a completion condition for the distortion correction processing holds after a start condition for the distortion correction processing holds; and a focus control unit configured to restrict the execution of the focus adjustment by the focus adjusting unit while the correction control unit causes the correcting unit to execute the distortion correction processing.

According to the aspect of the invention, the execution of the focus adjustment that consumes time for, for example, driving of a lens is restricted while the distortion correction for the image projected on the projection surface is performed. Therefore, it is possible to promptly complete the distortion correction.

In the projector of the aspect of the invention, the focus control unit may cause the focus adjusting unit to execute the focus adjustment for the projection optical system when the start condition for the distortion correction processing holds and the correction control unit causes the correcting unit to start the distortion correction processing.

According to this configuration, the distortion correction is executed in a state in which the focus is adjusted and a clear image is projected. Therefore, it is possible to surely and promptly perform the distortion correction.

The projector of the aspect of the invention may include a focus-adjustment-value calculating unit configured to calculate a focus adjustment value for the projection optical system on the basis of a projection condition. The focus adjusting unit may be configured to execute the focus adjustment according to the set focus adjustment value. When the focus adjustment value calculated by the focus-adjustment-value calculating unit when the distortion correction processing is started by the correcting unit and a focus adjustment value already set in the focus adjusting unit have a difference equal to or larger than a predetermined difference, the focus control unit may set, as a new focus adjustment value, the focus adjustment value calculated by the focus-adjustment-value calculating unit in the focus adjusting unit and cause the focus adjusting unit to execute the focus adjustment.

According to this configuration, the distortion correction is performed after the focus adjustment is performed when necessary. Therefore, it is possible to surely and more promptly execute the distortion correction in a state in which a clear image is projected.

In the projector of the aspect of the invention, the correction control unit may cause the correcting unit to execute the distortion correction processing a plurality of times until the completion condition for the distortion correction processing holds after the start condition for the distortion correction processing holds.

According to this configuration, the distortion correction is performed a plurality of times until the completion condition holds. Therefore, it is possible to execute the distortion correction following a change in projection conditions such as a projection distance and a projection angle. By restricting the focus adjustment in this period, it is possible to promptly execute the distortion correction every time and promptly follow a change in the projection conditions.

In the projector of the aspect of the invention, the correction control unit may cause the projecting unit to project an image for correction until the completion condition for the distortion correction processing holds after the start condition for the distortion correction processing holds. The correcting unit may correct distortion of the image projected by the projecting unit on the basis of a state of the image for correction projected by the projecting unit.

According to this configuration, it is possible to promptly execute the distortion correction on the basis of the image for correction clearly projected by performing the focus adjustment.

In the projector of the aspect of the invention, the correction control unit may determine, on the basis of the movement of the projector, whether the start condition for the distortion correction processing holds and whether the completion condition for the distortion correction processing holds.

According to this configuration, when the distortion correction is necessary, it is possible to promptly execute the correction according to the movement of the projector.

Another aspect of the invention is directed to a control method for a projector, the control method including: controlling a projector including a projecting unit including a projection optical system, which projects an image on a projection surface, and configured to project the image on the projection surface and a focus adjusting unit configured to perform focus adjustment for the projection optical system; and executing distortion correction processing for correcting distortion of the image projected by the projecting unit until a completion condition for the distortion correction processing holds after a start condition for the distortion correction processing holds and restricting the execution of the focus adjustment for the projection optical system while the distortion correction processing is executed.

According to the aspect of the invention, the execution of the focus adjustment that consumes time for, for example, driving of a lens is restricted while the distortion correction for the image projected on the projection surface is performed. Therefore, it is possible to promptly complete the distortion correction.

Advantageous Effects of Invention

According to the aspects of the invention, it is possible to restrict the execution of the focus adjustment that consumes time for, for example, driving of a lens and promptly complete the distortion correction.

DESCRIPTION OF EMBODIMENTS

An embodiment to which the invention is applied is explained below with reference to the drawings.

Figure 1:
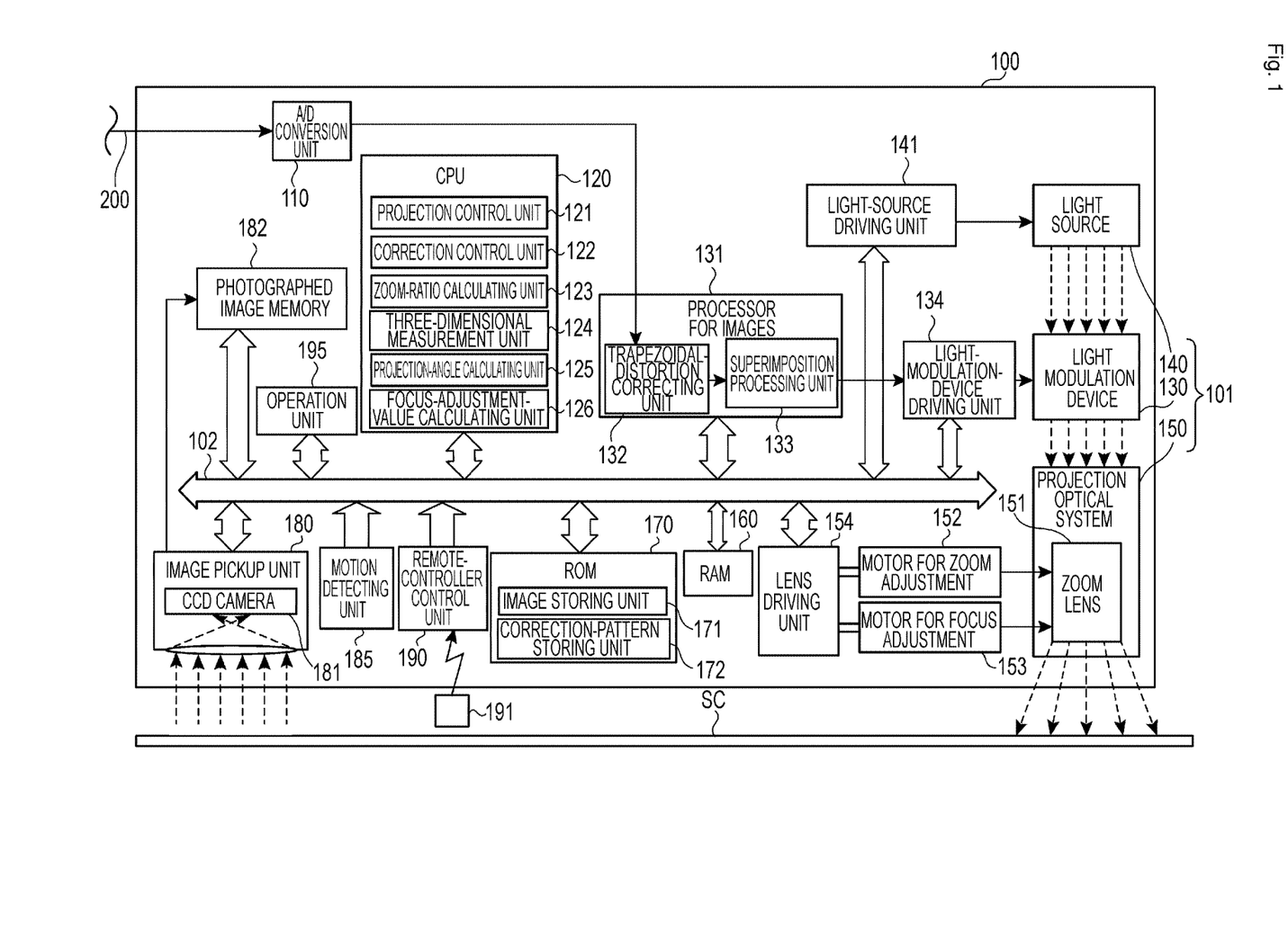
FIG. 1 is a block diagram showing the configuration of a projector according to an embodiment.

FIG. 1 is a block diagram showing an overall configuration of a projector 100 according to the embodiment. The projector 100 projects an image on a screen SC on the basis of an image stored in an image storing unit 171 incorporated therein or image data input from an external image supply apparatus (not shown in the figure) such as a personal computer or various video players. In this embodiment, the screen SC stands substantially upright. A screen surface is formed in a rectangular shape.

The image data input to the projector 100 may be either data of a moving image (a video) or data of a still image. The projector 100 can project the video on the screen SC and can continue to project the still image on the screen SC. In an example explained in the embodiment explained below, an image is projected on the basis of an analog image signal input from the external image supply apparatus via a cable 200.

The projector 100 roughly includes a projecting unit 101 (projecting means) that performs formation of an optical image and an image processing system that controls the operation of the entire projector 100 and electrically processes an image signal. The projecting unit 101 includes a light source 140, a light modulation device 130, and a projection optical system 150. As the light source 140, a Xenon lamp, an extra-high pressure mercury lamp, an LED (Light Emitting Diode), a laser light source, or the like can be used. The light source 140 may include a reflector and an auxiliary reflector that guide light emitted by the light source 140 to the light modulation device 130 and a dimming device (not shown in the figure) that reduces the light emitted by the light source 140 on a path leading to the light modulation device 130.

The light modulation device 130 receives a signal from the image processing system explained below and modulates the light emitted by the light source 140 into image light. Examples of a specific configuration of the light modulation device 130 include a system in which three transmissive or reflective liquid crystal light valves corresponding to the respective colors of RGB are used. In this case, the light emitted by the light source 140 is separated in to respective color lights of R, G, and B by a dichroic mirror or the like and made incident on the light modulation device 130. The respective color lights are modulated by liquid crystal panels for the respective colors included in the light modulation device 130. Thereafter, the respective color lights are combined by a cross-dichroic prism and guided to the projection optical system 150. In this embodiment, the light modulation device 130 includes a transmissive liquid crystal panel. The light modulation device 130 is driven by a light-modulation-device driving unit 134 explained below. The light modulation device 130 changes the transmittance of light in respective pixels arranged in a matrix shape to thereby form an image.

The projection optical system 150 includes a zoom lens 151 that performs expansion and reduction of an image to be projected and adjustment of a focus, a motor for zoom adjustment 152 that adjusts a degree of zoom, and a motor for focus adjustment 153 that performs adjustment of a focus. Light modulated by the light modulating device 130 is made incident on the projection optical system 150. The light is projected on the screen SC through the zoom lens 151 to focus a projected image. The zoom lens 151 includes a lens group including a plurality of lenses. A lens driving unit 154 drives the motor for zoom adjustment 152 and the motor for focus adjustment 153 to execute adjustment of the projection optical system 150 according to the control by the CPU 120. Specifically, the lens driving unit 154 controls the motor for zoom adjustment 152 to drive the zoom lens 151 and performs, for example, position adjustment for the lenses to perform zoom adjustment for expanding and reducing the projected image on the screen SC. The lens driving unit 154 functions as a focus adjusting means, controls the motor for focus adjustment 153 to drive the zoom lens 151, and performs focus adjustment for properly focusing the projected image on the screen SC.

The image processing system mainly includes a CPU 120 that collectively controls the entire projector 100 and a processor for images 131. The image processing system includes an A/D conversion unit 110, a light-modulation-device driving unit 134, a light-source driving unit 141, a lens driving unit 154, a RAM 160, a ROM 170 including an image storing unit 171 and a correction-pattern storing unit 172, an image pickup unit 180 including a CCD camera 181, a photographed image memory 182, a motion detecting unit 185, a remote-controller control unit 190, a remote controller 191, and an operation unit 195. The components included in the image processing system are connected to one another via a bus 102.

The A/D conversion unit 110 is a device that subjects an analog input signal, which is input from the external image supply apparatus via the cable 200, to A/D conversion. The A/D conversion unit 110 outputs a digital signal after the conversion to the processor for images 131.

The CPU 120 performs image processing in the projector 100 in cooperation with the processor for images 131. The CPU 120 includes, besides a projection control unit 121 that performs control related to projection by the projector 100, a correction control unit 122, a zoom-ratio calculating unit 123, a three-dimensional measurement unit 124, a projection-angle calculating unit 125, and a focus-adjustment-value calculating unit 126. The units are realized by the CPU 120 executing a program stored in the ROM 170 in advance. The CPU 120 functions as a controlling means. In particular the function of the projection control unit 121 is equivalent to the controlling means.

The processor for images 131 includes a trapezoidal-distortion correcting unit 132 and a superimposition processing unit 133. The processor for images 131 processes, according to the control by the CPU 120, image data input from the A/D conversion unit 110, generates an image signal for rendering a projected image using the light modulation device 130, and outputs the generated image signal to a light-modulation-device driving unit 134. The processor for images 131 can be configured using a general-purpose processor sold as a DSP (digital signal processor) for trapezoidal distortion correction and image processing and can be configured as a dedicated ASIC. When the projector 100 projects image data stored in the image storing unit 171, the processor for images 131 applies the processing explained above to the image data.

The light-modulation-device driving unit 134 drives the light modulation device 130 on the basis of an image signal input from the processor for images 131. Consequently, an image corresponding to the image signal input to the A/D conversion unit 110 is formed in an image forming region of the light modulation device 130. The image is formed on the screen SC as a projected image via the projection optical system 150.

The light-source driving unit 141 applies a voltage to the light source 141 and lights or extinguishes the light source 140 according to an instruction signal input from the CPU 120. The lens driving unit 154 drives the motor for zoom adjustment 152 and the motor for focus adjustment 153 to perform zoom adjustment and focus adjustment according to the control by the CPU 120.

The RAM 160 forms a work area for temporarily storing programs and data executed by the CPU 120 and the processor for images 131. The processor for images 131 may include, as a built-in RAM, a work area necessary for execution of various kinds of processing such as adjustment processing for a display state of an image performed by the processor for images 131.

The ROM 170 stores a program executed by the CPU 120 in order to realize the processing units and data and the like related to the program. The ROM 170 includes an image storing unit 171 that stores an image projected by the projecting unit 101 and a correction-pattern storing unit 172 that stores a correction pattern used for the distortion correction processing.

The image pickup unit 180 includes a CCD camera 181 including a CCD, which is a well-known image sensor. The image pickup unit 180 is provided on the front surface of the projector 100, i.e., in a position where the image pickup unit 180 can pick up, with the CCD camera 181, an image in a direction in which the projection optical system 150 projects an image to the screen SC. In the image pickup unit 180, a camera direction and an angle of view of the CCD camera 181 are set such that an entire projected image projected on the screen SC at a recommended projection distance lies within at least an image pickup range. The CCD camera 181 may include, besides a CCD, a single focus lens that forms an image on the CCD, a mechanism such as an auto iris that adjusts an amount of light made incident on the CCD and a control circuit that reads out an image signal from the CCD. Data of a photographed image photographed by the CCD camera 181 is output from the image pickup unit 180 to the photographed image memory 182 and repeatedly written in a predetermined region of the photographed image memory 182. When writing of image data for one screen is completed, the photographed image memory 182 sequentially reverses a flag of a predetermined region. Therefore, by referring to the flag, the CPU 120 can learn whether image pickup performed using the image pickup unit 180 is completed. The CPU 120 accesses the photographed image memory 182 and acquires necessary photographed image data while referring to the flag.

The motion detecting unit 185 includes a gyro sensor and an acceleration sensor. The motion detecting unit 185 detects a motion of a main body of the projector 100 and outputs a detection value to the CPU 120. A threshold is set for the detection value of the motion detecting unit 185 in advance. When a motion exceeding the threshold is detected by the motion detecting unit 185, the CPU 120 determines that the projector 100 has moved. When a motion detected by the motion detecting unit 185 is equal to or smaller than the threshold and this state continues exceeding a standby time set in advance, the CPU 120 determines that the projector 100 has stood still. The motion detecting unit 185 may be configured to output a detection signal to the CPU 120 when the threshold is set in the motion detecting unit 185 and the detection value of the motion detecting unit 185 exceeds the threshold and when the detection value of the motion detecting unit 185 is equal to or smaller than the threshold and the standby time elapses. In this case, it is possible to reduce a load on the CPU 120.

The remote-controller control unit 190 receives a radio signal transmitted from the remote controller 191 on the outside of the projector 100. The remote controller 191 includes operators (not shown in the figure) operated by a user. The remote controller 191 transmits an operation signal corresponding to operation of the operators as an infrared signal or a radio signal that is transmitted using a radio wave having a predetermined frequency. The remote-controller control unit 190 includes a light receiving unit (not shown in the figure) that receives the infrared signal and a receiving circuit (not shown in the figure) that receives the radio signal. The remote-controller control unit 190 receives a signal transmitted from the remote controller 191, analyzes the signal, generates a signal indicating content of the operation by the user, and outputs the signal to the CPU 120.

The operation unit 195 includes, for example, operators (not shown in the figure) of an operation panel arranged in a main body of the projector 100. Upon detecting operation of the operators, the operation unit 195 outputs an operation signal corresponding to the operators to the CPU 120. As the operators, there are a switch for instructing power on/power off, a switch for instructing a distortion correction processing start, and the like.

Functions of the CPU 120 and the processor for images 131 are explained.

The projection control unit 121 controls, on the basis of image data output by the A/D conversion unit 110, an action of projection of an image by the projecting unit 101. Specifically, the projection control unit 121 performs control for causing the light-source driving unit 141 to light/extinguish the light source 140 according to power on/off of the projector 100, control for causing the processor for images 131 to process image data output by the A/D conversion unit 110, and the like.

The projection control unit 121 has a function of starting and ending distortion correction processing by the correction control unit 122 for controlling the trapezoidal-distortion correcting unit 132 and correcting trapezoidal distortion. The projection control unit 121 functions as a correction controlling means. The correction control unit 122 cooperates with the trapezoidal-distortion correcting unit 132 and functions as a correcting means.

As a start condition for starting the distortion correction processing, it is set in advance that, for example, a motion of the projector 100 is detected on the basis of a detection value of the motion detecting unit 185 or the distortion correction processing is instructed by operation of the operation unit 195 or the remote controller 191. When any one of the set conditions is met, the projection control unit 121 determines that the start condition for the distortion correction processing holds. The projection control unit 121 controls the superimposition processing unit 133 of the processor for images 131 to superimpose a correction pattern (an image for adjustment) stored in the correction-pattern storing unit 172 on an image being projected and project the correction pattern. Consequently, the image that has been projected from before the start of the distortion correction processing and the correction pattern are displayed one on top of the other.

The projection control unit 121 causes the correction control unit 122 to execute the distortion correction processing. The correction control unit 122 causes the image pickup unit 180 to pick up a projected image in a state in which the correction pattern stored in the image storing unit 171 is projected on the screen SC. The correction control unit 122 acquires photographed image data from the photographed image memory 182 and causes the processing units, i.e., the zoom-ratio calculating unit 123, the three-dimensional measurement unit 124, and the projection-angle calculating unit 125 explained later to calculate a projection angle and a projection distance on the basis of the photographed image data. The correction control unit 122 outputs control data corresponding to the projection angle to the processor for images 131 and causes the focus-adjustment-value calculating unit 126 (focus-adjustment-value calculating means) to calculate a focus setting value corresponding to the projection distance. The projection control unit 121 sets the calculated focus adjustment value in the lens driving unit 154 and drives the motor for focus adjustment 153 according to the focus adjustment value to perform focus adjustment. The projection control unit 121 functions as a focus controlling means.

The correction control unit 122 calculates parameters for performing the distortion correction processing on the basis of the projection angle and the projection distance calculated by the functions of the processing units, i.e., the zoom-ratio calculating unit 123, the three-dimensional measurement unit 124, and the projection-angle calculating unit 125. The parameters are parameters for deforming an image rendered by the light modulation device 130 such that the image compensates for distortion of a projected image on the screen SC. The parameters are data for defining the direction of the deformation, a deformation amount, and the like. The correction control unit 122 outputs the calculated parameters to the trapezoidal-distortion correcting unit 132 and causes the trapezoidal-distortion correcting unit 132 to execute the distortion correction processing.

The processing units, i.e., the zoom-ratio calculating unit 123, the three-dimensional measurement unit 124, and the projection-angle calculating unit 125 perform, according to the control by the correction control unit 122, processing necessary for calculating a projection angle, which is a tilt of an optical axis of projected light projected from the projector 100 with respect to the plane of the screen SC. Specifically, the zoom-ratio calculating unit 123 calculates a zoom ratio of the projection optical system 150. The three-dimensional measurement unit 124 and the projection-angle calculating unit 125 detects a correction pattern from photographed image data and calculates, on the basis of the size and the position of the detected correction pattern, taking into account the zoom ratio calculated by the zoom-ratio calculating unit 123, a relative three-dimensional arrangement relation between the projector 100 and the screen SC including the projection distance, which is the distance from the projector 100 to the screen SC, and the projection angle, which is the tilt of the optical axis of the projected light projected by the projector 100 with respect to the screen plane. The focus-adjustment-value calculating unit 126 calculates a focus adjustment value suitable for the calculated projection distance.

The processor for images 131 is a functional unit that processes image data input from the A/D conversion unit 110. The processor for images 131 applies, to projection target image data, processing for adjusting a display state of an image such as luminance, contrast, the depth of a color, and a tint and outputs the image data after the processing to the light-modulation-device driving unit 134.

The trapezoidal-distortion correcting unit 132 included in the processor for images 131 performs, according to the parameters input from the correction control unit 122, processing for deforming the image of the image data output by the A/D conversion unit 110.

The superimposition processing unit 133 has a function of superimposing the correction pattern stored in the correction-pattern storing unit 172 on a projected image. The superimposition processing unit 133 is connected to the post stage of the trapezoidal-distortion correcting unit 132. The image data after the processing by the trapezoidal-distortion correcting unit 132 is input to the superimposition processing unit 133. Therefore, when the trapezoidal-distortion correcting unit 132 performs the distortion correction processing and when the trapezoidal-distortion correcting unit 132 does not perform the distortion correction processing, the superimposition processing unit 133 superimposes the correction pattern on the image data processed by the trapezoidal-distortion correcting unit 132. With this configuration, the distortion correction processing is not applied to the image on which the superimposition processing unit 133 superimposes the correction pattern. In other words, the correction pattern projected by the projector 100 is always in a state in which the distortion correction processing is not applied to the correction pattern.

Figure 2A:
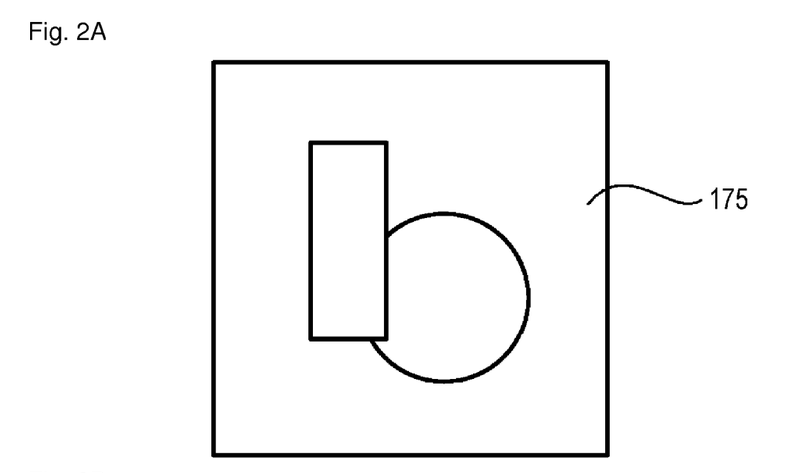
FIG. 2A is an explanatory diagram showing the operation of the projector for projecting an image and a correction pattern, and showing an example of the image.
Figure 2B:
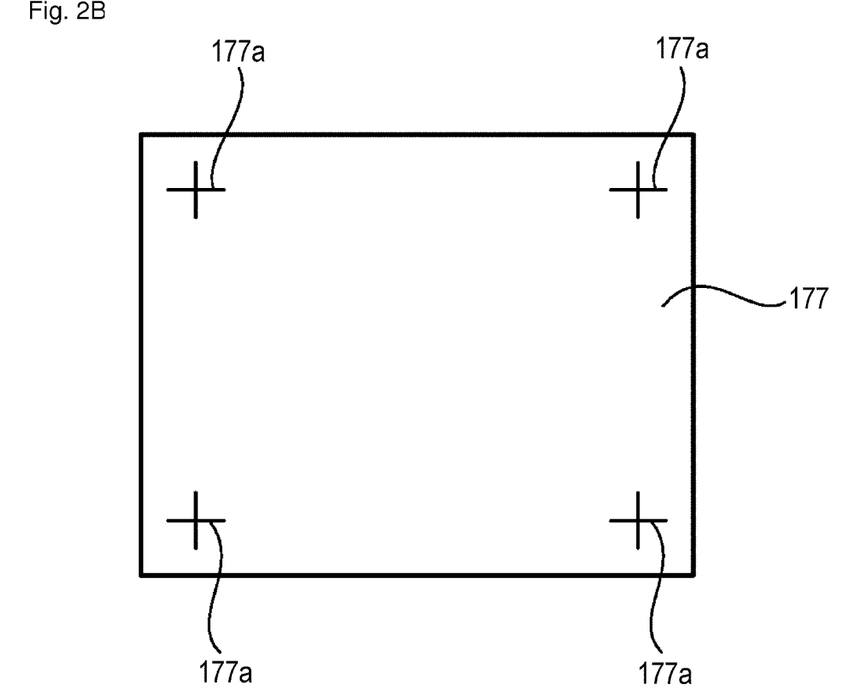
FIG. 2B is an explanatory diagram showing the operation of the projector for projecting an image and a correction pattern, and showing an example of the correction pattern.
Figure 2C:
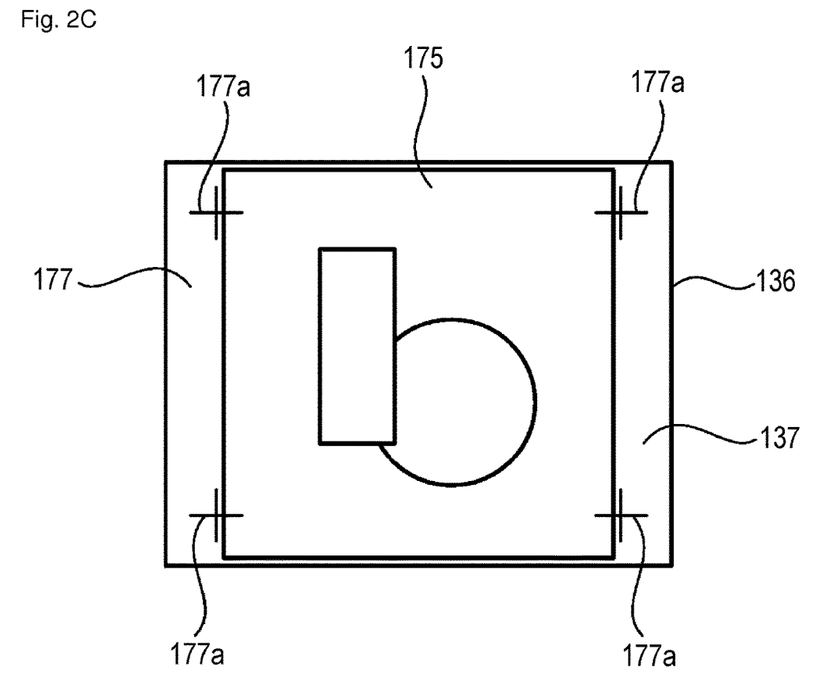
FIG. 2C is an explanatory diagram showing the operation of the projector for projecting an image and a correction pattern, and showing an example in which a light modulation device renders the image and the correction pattern.

Subsequently, the operation of the projector 100 is explained. FIGS. 2A to 2C are explanatory diagrams showing the operation of the projector 100 for projecting an image and a correction pattern. FIG. 2A shows an example of the image. FIG. 2B shows an example of the correction pattern. FIG. 2C shows an example in which the light modulation device 130 renders the image and the correction pattern in an image formable region 136.

In this embodiment, an example in which a rectangular image 175 is projected as shown in FIG. 2A is explained. In this embodiment, as an example of the correction pattern, a correction pattern 177 shown in FIG. 2B is explained. The correction pattern 177 has a rectangular shape as a whole in which cross-shaped markers 177a are arranged in the vicinity of the four corners. A portion other than the markers 177a is colorless (transparent).

In a state in which the trapezoidal-distortion correcting unit 132 is not performing the distortion correction processing, when the superimposition processing unit 133 superimposes the correction pattern 177 on the image 175, an image shown in FIG. 2C is rendered in the image formable region 136 of the light modulation device 130. As in the example shown in FIG. 2C, in the state in which the distortion correction processing is not performed, the image is rendered widely using the image formable region 136 of the light modulation device 130. Therefore, an image forming region 137 is provided in the entire image formable region 136. The image 175 is formed (rendered) in the image forming region 137. In the image forming region 137, the correction pattern 177 is rendered to be superimposed on the image 175. Since the correction pattern 177 excluding the markers 177a is transparent, the markers 177a are rendered while overlapping the image 175.

Figure 3A:
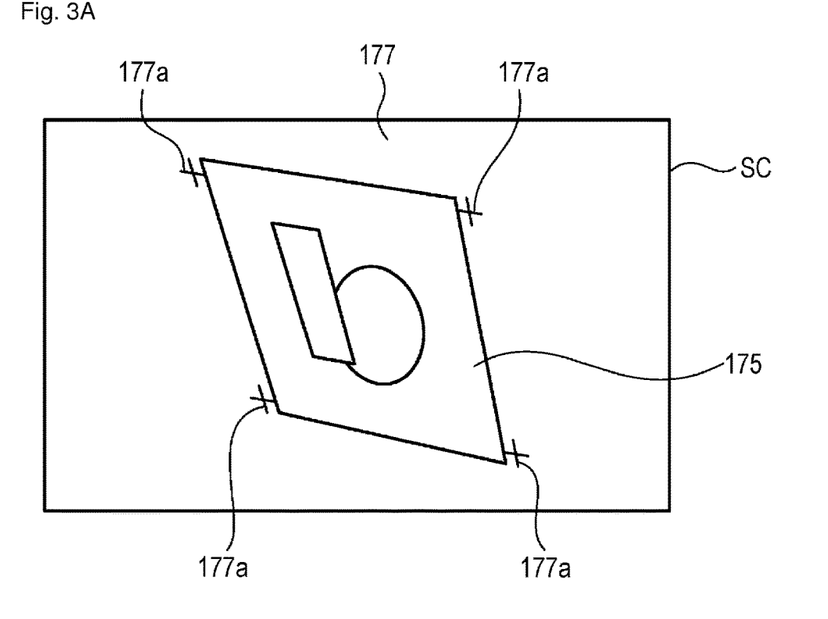
FIG. 3A is an explanatory diagram showing an example of the operation of the projector for correcting distortion of a projected image, and showing an projection example on a screen before correction.
Figure 3B:
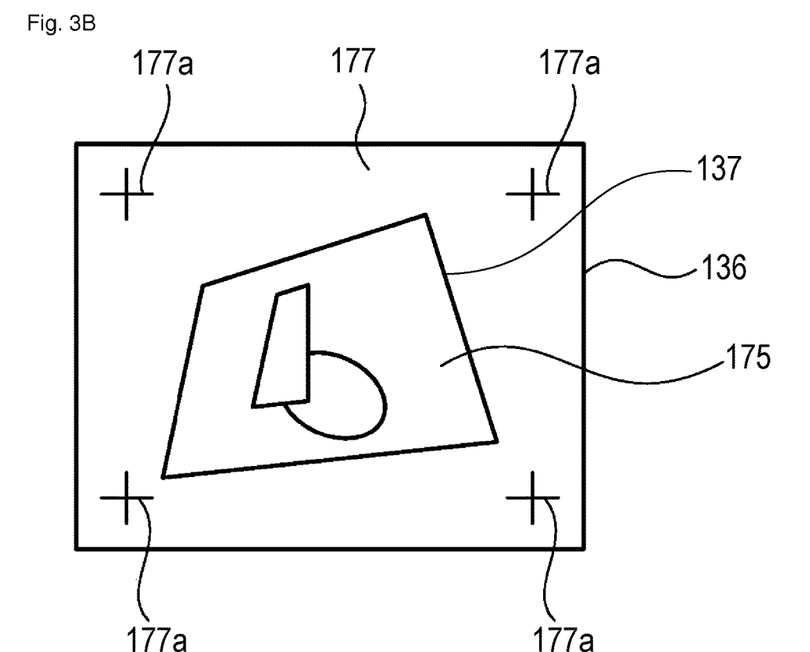
FIG. 3B is an explanatory diagram showing an example of the operation of the projector for correcting distortion of a projected image, and showing an example of an image formed on an image formable region.
Figure 3C:
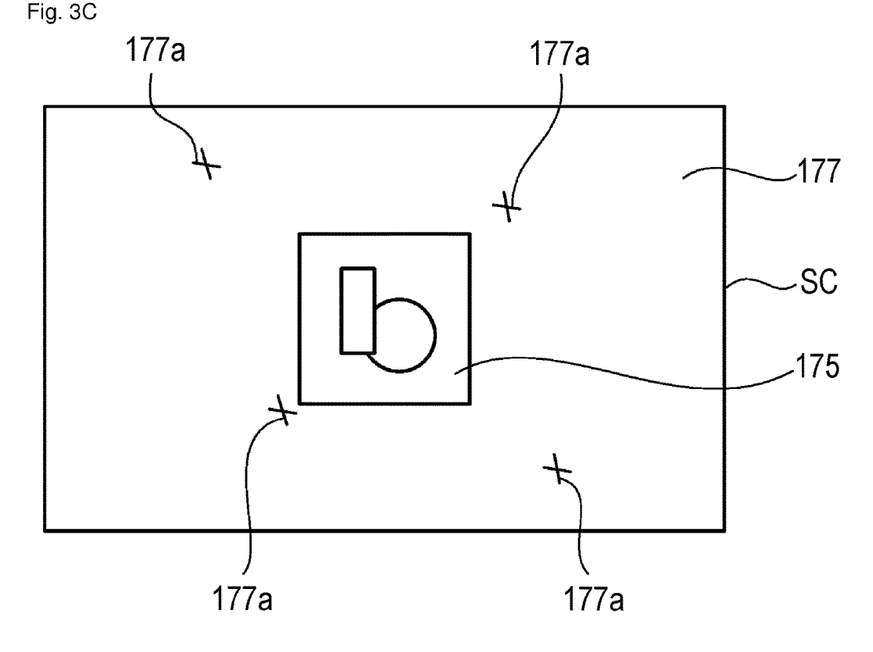
FIG. 3C is an explanatory diagram showing an example of the operation of the projector for correcting distortion of a projected image, and showing a projection example on the screen after the correction.

FIGS. 3A to 3C are explanatory diagrams showing an example of the operation of the projector 100 for correcting distortion of a projected image. FIG. 3A shows a projection example on the screen SC before correction. FIG. 3B shows an example of an image formed in the image formable region 136. FIG. 3C shows a projection example on the screen SC after the correction. In the image projected on the screen SC, trapezoidal distortion occurs as shown in FIG. 3A according to a projection angle of the projector 100 with respect to the screen SC. In FIG. 3A, an example in which the image obtained by superimposing the correction pattern 177 on the image 175 as shown in FIG. 2C is projected is shown. In this example, the image 175 is projected while being distorted. The positions of the markers 177a deviate in the arrangement in the rectangle according to trapezoidal distortion.

The correction control unit 122 executes the distortion correction processing. The trapezoidal-distortion correcting unit 132 deforms the image 175. Consequently, the deformed image 175 is included in an image output from the processor for images 131 to the light-modulation-device driving unit 134. Therefore, the deformed image 175 is rendered in the image forming region 137 of the light modulation device 130 as shown in FIG. 3B. It is necessary to render the deformed image 175 on the inside of the rectangular image formable region 136. Therefore, the image forming region 137 in which the image 175 is rendered is a part of the image formable region 136.

As explained above, the correction pattern 177 is superimposed on the image after the distortion correction processing, which is output by the trapezoidal-distortion correcting unit 132, by the superimposition processing unit 133 connected to the post stage of the trapezoidal-distortion correcting unit 132. Therefore, the distortion correction processing is not applied to the correction pattern 177. Therefore, as shown in FIG. 3B, the four markers 177a arranged at the four corners of the rectangle are rendered on the image 175 in a state same as the state shown in FIG. 2C before the distortion correction processing.

Consequently, as shown in FIG. 3C, the trapezoidal distortion of the image 175 is corrected and the image 175 is projected in a rectangular shape on the screen SC. However, the state of the trapezoidal distortion is left in the correction pattern 177. In other words, the positions of the markers 177a deviate from the positions where the markers 177a are arranged when there is no trapezoidal distortion.

When the correction control unit 122 corrects the trapezoidal distortion, the correction control unit 122 causes the image pickup unit 180 to photograph the screen SC, detects the positions of the markers 177a from a photographed image, and performs calculation by the three-dimensional measurement unit 124 and the projection-angle calculating unit 125 on the basis of the positions. The correction control unit 122 calculates parameters for distortion correction on the basis of results of the calculation and sets the calculated parameters in the trapezoidal-distortion correcting unit 132. In the series of processing, the correction control unit 122 compares the positions of the markers 177a detected in the photographed image data of the image pickup unit 180 with the positions of the markers 177a in the data of the correction patterns 177 stored in the correction-pattern storing unit 172. Therefore, after the distortion correction processing is performed as shown in FIG. 3C, when the distortion correction processing is further performed, the correction control unit 122 causes the image pickup unit 180 to photograph the screen SC anew, detects the markers 177a from new photographed image data, and calculates parameters.

When the distortion correction processing is performed, if not only the image 175 but also the correction pattern 177 is deformed according to the parameters, the markers 177a are moved by the distortion correction processing. Therefore, the positions of the markers 177a on the screen SC are different positions according to the processing performed by the trapezoidal-distortion correcting unit 132 in addition to the projection angle and the projection distance between the screen SC and the projector 100. Therefore, it is impossible to accurately calculate the projection angle and the projection distance between the screen SC and the projector 100 simply by photographing the markers 177a moved by the trapezoidal-distortion correcting unit 132 and comparing the positions of the markers 177a in photographed image data with the positions of the markers 177a in the correction pattern 177 stored in the correction-pattern storing unit 172. In order to accurately calculate the projection angle and the projection distance, it is necessary to perform processing for excluding the influence of the distortion correction processing performed earlier.

When it is determined by the control by the projection control unit 121 that a start condition for the distortion correction processing holds, the projector 100 executes the distortion correction processing before the projector 100 stands still and, thereafter, repeatedly executes the distortion correction processing at a period set in advance until a condition for completing the distortion correction processing is met. Consequently, the distortion correction processing is periodically performed and an image after correction is projected on the screen SC. Therefore, a user who uses the projector 100 can see a state of the correction even before the projector 100 stands still or the operation for completing the distortion correction processing is performed. Before the standby time elapses after the movement of the projector 100 stops, the distortion correction processing is executed in a state in which the projector 100 stands still. Therefore, the corrected image is projected on the screen SC according to a position where the projector 100 stands still. Consequently, substantially, it is possible to project the corrected image before the standby time elapses and promptly project an image without distortion. In this case, it is desirable that the period of the repeated execution of the distortion correction processing by the projector 100 is time shorter than the standby time.

When the distortion correction is continuously executed a plurality of times in this way, if the distortion correction processing is applied to the correction pattern 177 as well, it is necessary to perform, concerning the positions of the markers 177a, calculation for excluding the influence of the distortion correction performed the plurality of times. A load of the processing for calculating the parameters increases. Therefore, as in this embodiment, if the distortion correction processing is not performed concerning the correction pattern 177, the positions of the markers 177a are always positions shifted by reflecting the projection angle and the distance between the screen SC and the projector 100. Therefore, even if the distortion correction processing is repeatedly performed, it is possible to promptly calculate the projection angle and the distance between the screen SC and the projector 100 accurately and calculate accurate parameters on the basis of the positions of the markers 177a. A load of the processing for calculating the parameters does not increase even if the distortion correction processing is repeatedly performed.

Furthermore, in this embodiment, the superimposition processing unit 133 that performs processing for superimposing the correction pattern 177 on the image projected by the projecting unit 101 is connected to the post stage of the trapezoidal-distortion correcting unit 132 that performs the distortion correction processing. An image subjected to the superimposition processing by the superimposition processing unit 133 is output to the light-modulation-device driving unit 134 and rendered on the light modulation device 130. Therefore, since a procedure of the processing in the projector 100 is a procedure in which the correction pattern 177 is not affected by the distortion correction processing, it is possible to prevent, without performing special processing, the correction pattern 177 from being deformed in the distortion correction processing.

When the projection control unit 121 causes the correction control unit 122 to execute the distortion correction processing, the projection control unit 121 causes the lens driving unit 154 to execute focus adjustment. The focus adjustment is executed before the correction control unit 122 calculates parameters for distortion correction after the start condition for the distortion correction processing holds. The correction pattern 177 and the image 175 are clearly projected according to the processing. Therefore, it is possible to surely detect the correction pattern 177 from photographed image data in the distortion correction processing performed thereafter. Further, when the correction pattern 177 in the photographed image data is unclear, processing for detecting an image of the correction pattern 177 often takes time. Therefore, by executing the focus adjusting first, it is possible to promptly execute the processing for detecting the correction pattern 177.

Further, after once executing the focus adjustment, the projection control unit 121 restricts the execution of the focus adjustment until the completion condition for the distortion correction processing holds. In other words, until the completion condition for the distortion correction processing holds, the projector 100 repeatedly executes, a plurality of times, the operation for calculating parameters for the distortion correction and correcting distortion of the projected image 175. However, the projector 100 does not perform the focus adjustment. In the focus adjustment, since the zoom lens 151 is moved by the motor for focus adjustment 153, the focus adjustment takes time compared with the distortion correction processing including the calculation processing and the image processing. Therefore, it is possible to execute the distortion correction processing in a short time and promptly correct distortion of a projected image on the screen SC by restricting the focus adjustment. Therefore, it is possible to repeatedly execute the distortion correction processing in a shorter time.

Figure 4:
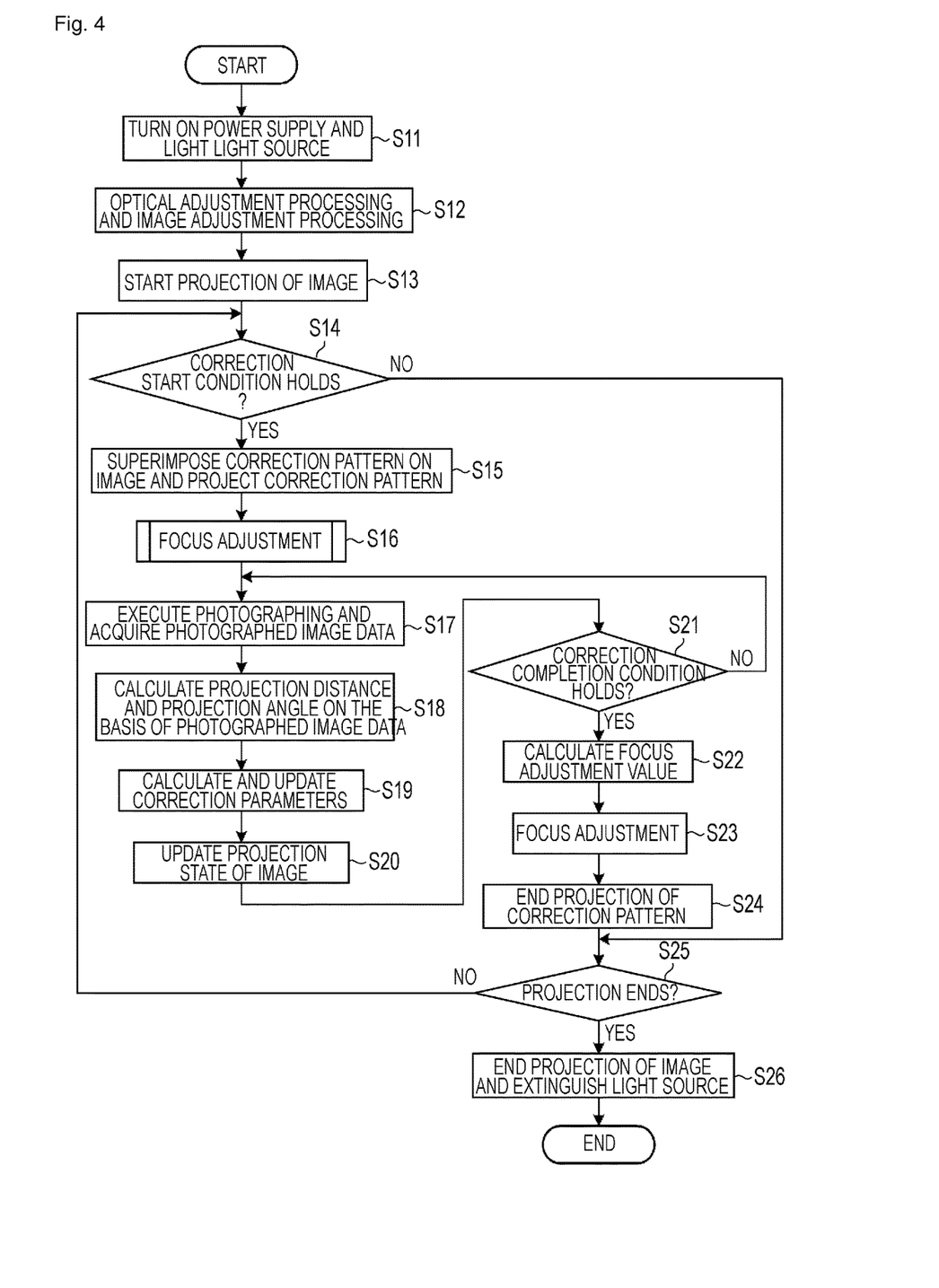
FIG. 4 is a flowchart for explaining the operation of the projector.

FIG. 4 is a flowchart for explaining the operation of the projector 100.

When a power supply for the projector 100 is switched to ON, the CPU 120 of the projector 100 controls the light-source driving unit 141 to light the light source 140 (step S11). Further, the CPU 120 controls the lens driving unit 154 to execute optical adjustment in the projection optical system 150 and causes the processor images 131 to execute, for example, adjustment adapted to the brightness of an image and a designated color mode (step S12). Thereafter, the projection control unit 121 included in the CPU 120 projects an image output from the A/D conversion unit 110 (step S13).

After starting the projection, the projection control unit 121 determines whether the start condition for the distortion correction processing holds (step S14). As explained above, the start condition is that start instruction operation by the remote controller 191 or the operation unit 195 is performed or a detection value of the motion detecting unit 185 exceeds the threshold. When the start condition for the distortion correction processing holds (Yes in step S14), the projection control unit 121 reads out the correction pattern stored in the correction-pattern storing unit 172, causes the superimposition processing unit 133 to superimpose the correction pattern on the image, and causes the projecting unit 101 to project the correction pattern on the screen SC (step S15).

After projecting the image and the correction pattern on the screen SC, the projection control unit 121 executes the focus adjustment (step S16).

Figure 5:
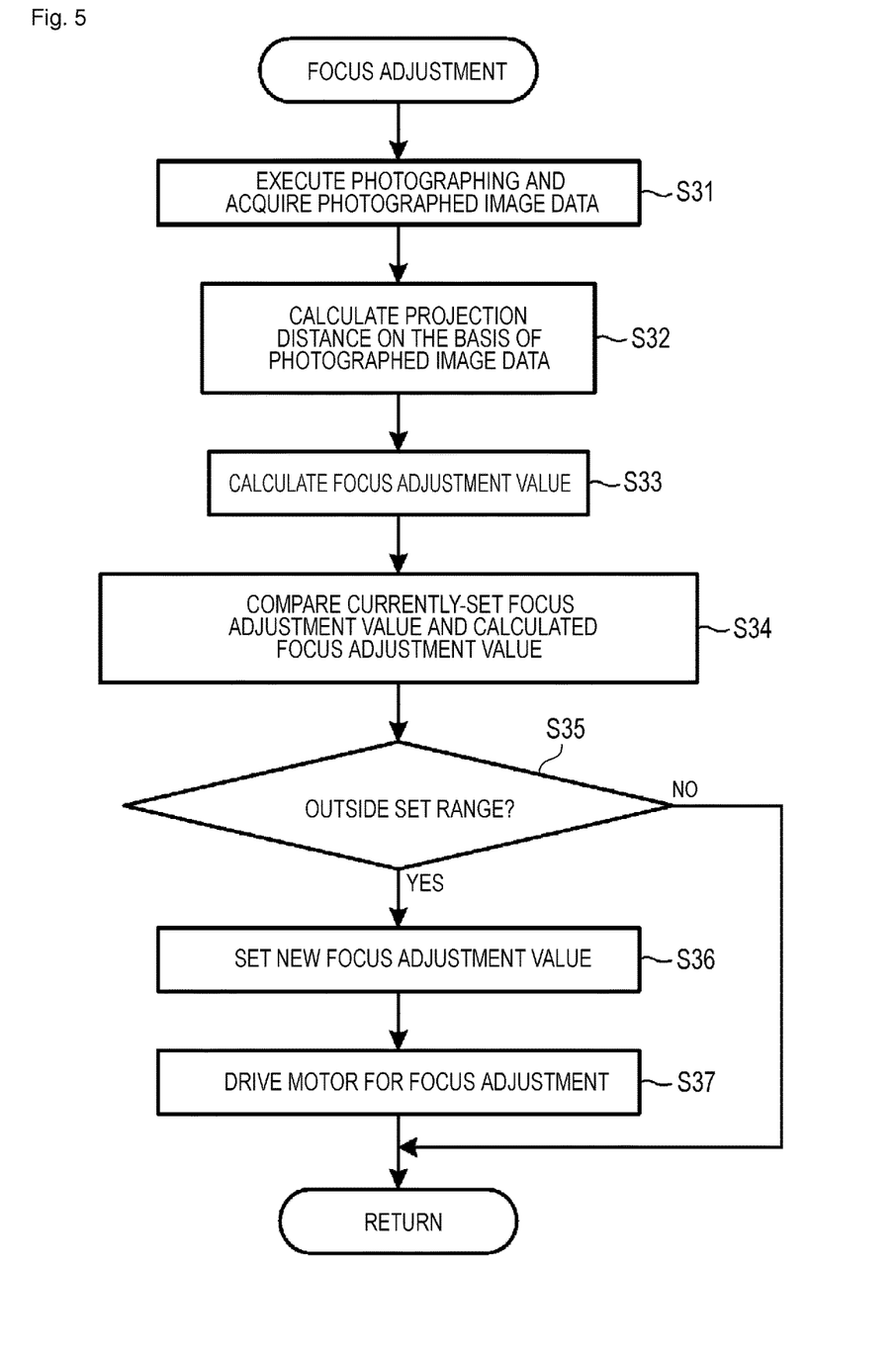
FIG. 5 is a flowchart for explaining the operation of the projector.

FIG. 5 is a flowchart for explaining the operation of the projector 100. The focus adjustment in step S16 is shown in detail.

The projection control unit 121 causes the image pickup unit 180 to photograph the screen SC and acquires photographed image data from the photographed image memory 182 (step S31). The projection control unit 121 detects markers of a correction pattern in the photographed image data, performs calculation by the three-dimensional measurement unit 124, and calculates a projection distance (step S32). The projection control unit 121 causes the focus-adjustment-value calculating unit 126 to calculate a focus adjustment value on the basis of the calculated projection distance (step S33).

The projection control unit 121 compares a focus adjustment value currently set in the lens driving unit 154 and the focus adjustment value calculated by the focus-adjustment-value calculating unit 126 in step S33 (step S34). The projection control unit 121 discriminates whether the focus adjustment value calculated in step S33 is a value outside a range set in advance centering on the set focus adjustment value (step S35). For example, when the motion detecting unit 185 detects the movement of the projector 100 and the start condition holds, it is likely that a projection distance changes from a projection distance before the start condition holds. In such a case, since the focus adjustment value set in the lens driving unit 154 is a value set before the start condition holds, the focus adjustment value does not match the projection distance after the start condition holds. It is desirable to perform the focus adjustment in order to accurately and promptly perform the distortion correction. Therefore, in step S33, the projection control unit 121 discriminates, with reference to the range set in advance concerning the set focus adjustment value, whether a change in the projection distance that makes it necessary to perform the focus adjustment occurs.

When the focus adjustment value calculated in step S33 is outside the range set in advance centering on the set focus adjustment value (Yes in step S35), the projection control unit 121 sets the new focus adjustment value calculated by the focus-adjustment-value calculating unit 126 in step S33 in the lens driving unit 154 (step S36). The lens driving unit 154 drives the motor for focus adjustment 153 according to the control by the projection control unit 121 and executes the focus adjustment by the zoom lens 151 (step S37). Consequently, the focus adjustment is performed according to the projection distance. The screen SC is made clear. The projection control unit 121 ends the processing and shifts to step S17 in FIG. 4.

When the focus adjustment value calculated in step S33 is within the range of the focus adjustment value set in the lens driving unit 154 (No in step S35), the projection control unit 121 ends the processing without executing the focus adjustment and shifts to step S17.

As explained above, in the operation shown in FIG. 5, the CPU 120 discriminates presence or absence of necessity of the focus adjustment and, only when the focus adjustment is necessary, performs the focus adjustment. Therefore, after the execution of the operation shown in FIG. 5, irrespective of whether the focus adjustment by the lens driving unit 154 is performed, a projected image on the screen SC is clear.

In step S17 in FIG. 4, the projection control unit 121 causes the image pickup unit 180 to photograph the screen SC and acquires photographed image data from the photographed image memory 182. The projection control unit 121 detects markers in a correction pattern in the photographed image data, performs calculation by the three-dimensional measurement unit 124 and the projection-angle calculating unit 125, and calculates a projection distance and a projection angle (step S18). When the focus adjustment in step S37 in FIG. 5 is not executed, the projection control unit 121 may use the photographed image data photographed in step S31 without executing the photographing in step S17 or may use the projection distance and the like calculated in step S32 without performing the calculation in step S18.

Thereafter, the correction control unit 122 calculates, on the basis of the projection distance and the projection angle calculated by the three-dimensional measurement unit 124 and the projection-angle calculating unit 125, parameters for the distortion correction for correcting trapezoidal distortion and updates the parameters set in the trapezoidal-distortion correcting unit 132 with new parameters (step S19). Consequently, the distortion correction processing based on the new parameters is applied by the trapezoidal-distortion correcting unit 132. An image obtained by the superimposition processing unit 133 superimposing the correction pattern on an image after the processing is projected on the screen SC (step S20).

The projection control unit 121 determines whether the condition for completing the distortion correction processing holds (step S21). As explained above, the condition for completing the distortion correction processing is that instruction operation for completing the distortion correction processing is performed by the remote controller 191 or the operation unit 195 or the detection value of the motion detecting unit 185 is equal to or smaller than the threshold and a standby time elapses. When both the conditions do not hold (No in step S21), the projection control unit 121 returns to step S17. In other words, the projection control unit 121 repeats the processing for calculating and update parameters for distortion correction without executing the focus adjustment.

When the condition for completing the distortion correction processing holds (Yes in step S21), the projection control unit 121 causes the focus-adjustment-value calculating unit 126 to calculate a focus adjustment value on the basis of the latest projection distance calculated in the processing in step S18 (step S22), sets the calculated focus adjustment value in the lens driving unit 154, and causes the lens driving unit 154 to execute the focus adjustment (step S23).

Subsequently, the projection control unit 121 causes the superimposition processing unit 133 to ends the processing for superimposing the correction pattern (step S24). Thereafter, the projection control unit 121 determines whether the projector 100 ends the projection (step S25). When the projector 100 does not end the projection (No in step S25), the projection control unit 121 returns to step S14. When the projector 100 ends the projection according to the operation by the remote controller 191 or the operation unit 195 (Yes in step S25), the projection control unit 121 stops the operation related to the projection of the image by the projecting unit 101 and extinguishes the light source 140 (step S26).

When the start condition for the distortion correction processing does not hold (No in step S14), the projection control unit 121 shifts to step S25 and determines whether the projection ends. When the projector 100 does not end the projection in step S25, the projection control unit 121 returns to step S14 and repeatedly determines whether the start condition holds. A period of the determination in step S14 is set in advance. In other words, the determination is repeatedly executed at the set period while the start condition does not hold and the projector does not end the projection.

As explained above, the projector 100 according to the embodiment to which the invention is applied includes the projection optical system 150. The projector 100 includes the projecting unit 101 that projects an image on the projection surface, the lens driving unit 154 that performs the focus adjustment for the projection optical system 150, the trapezoidal-distortion correcting unit 132 that performs the distortion correction processing for correcting distortion of the image projected by the projecting unit 101, and the projection control unit 121 that causes the trapezoidal-distortion correcting unit 132 to execute the distortion correction processing until the completion condition for the distortion correction processing holds after the start condition for the distortion correction processing holds and restricts, while causing the trapezoidal-distortion correcting unit 132 to execute the distortion correction processing, the execution of the focus adjustment for the projection optical system 150 by the lens driving unit 154. Consequently, while the trapezoidal distortion correction for the projected image is performed, since the execution of the focus adjustment that consumes time for, for example, the driving of the zoom lens 151 is restricted, it is possible to promptly complete the distortion correction.

When the start condition for the distortion correction processing holds and the projection control unit 121 causes the trapezoidal-distortion correcting unit 132 to start the distortion correction processing, the projection control unit 121 causes the lens driving unit 154 to execute the focus adjustment. Consequently, since the distortion correction is executed in a state in which a focus is adjusted, it is possible to surely and promptly perform the distortion correction.

The projector 100 includes the focus-adjustment-value calculating unit 126 that calculates a focus adjustment value for the projection optical system 150. The lens driving unit 154 is configured to execute the focus adjustment according to the set focus adjustment value. When the focus adjustment value calculated by the focus-adjustment-value calculating unit 126 when the distortion correction processing is started by the trapezoidal-distortion correcting unit 132 and a focus adjustment value already set in the lens driving unit 154 have a difference equal to or larger than a predetermined difference, the projection control unit 121 sets, as a new focus adjustment value, the focus adjustment value calculated by the focus-adjustment-value calculating unit 126 in the lens driving unit 154 and executes the focus adjustment. Consequently, the distortion correction is performed after the focus adjustment is performed to make the projected image clear when necessary. Therefore, it is possible to surely and more promptly execute the distortion correction.

Since the projection control unit 121 causes the trapezoidal-distortion correcting unit 132 to execute the distortion correction processing a plurality of times until the completion condition for the distortion correction processing holds after the start condition for the distortion correction processing holds, the distortion correction following a change in the projection condition can be executed. Therefore, by restricting the focus adjustment in this period, it is possible to promptly execute the distortion correction every time. Therefore, it is possible to promptly follow a change in the projection conditions.

The projection control unit 121 causes the projecting unit 101 to project the correction pattern 177 until the completion condition for the distortion correction processing holds after the start condition for the distortion correction processing holds. The trapezoidal-distortion correcting unit 132 corrects distortion of the image projected by the projecting unit 101 on the basis of a projection state of the correction pattern 177 projected by the projecting unit 101. Therefore, it is possible to promptly execute the distortion correction on the basis of the correction pattern clearly projected on the screen SC.

The projection control unit 121 determines, on the basis of the movement of the projector 100, whether the start condition for the distortion correction processing holds and whether the completion condition for the distortion correction processing holds. Therefore, when the distortion correction is necessary, it is possible to promptly execute the correction according to the movement of the projector 100.

In the embodiment, as explained with reference to FIG. 5, the focus adjustment is executed before the parameters for distortion correction are calculated after the start condition for the distortion correction processing holds. In this configuration, a focus adjustment value is calculated and, when the focus adjustment value deviates from a predetermined range of a focus adjustment value already set in the lens driving unit 154, i.e., when a difference between the focus adjustment values exceeds a set range, the focus adjustment is executed. However, the invention is not limited to this. Besides, there are examples of operations related to the focus adjustment.

Modification 1

After calculating the focus adjustment value in step S33, without performing the comparison with the focus adjustment value set in the lens driving unit 154 (steps S34 and S35), the projection control unit 121 may always execute the focus adjustment (steps S36 and S37) on the basis of the calculated latest focus adjustment value. In this case, the projection control unit 121 performs the focus adjustment without discriminating a state of the focus adjustment. In this example, since only one operation of the focus adjustment is added, time required for the distortion correction does not substantially increase. There is an advantage that processing is simplified and a load is reduced.

Modification 2

When the focus adjustment value set in the lens driving unit 154 is not a value within a range set in advance, the projection control unit 121 may execute the focus adjustment (steps S36 and S37) on the basis of the latest focus adjustment value calculated in step S33. In other words, when a standard range of a focus adjustment value during the distortion correction is set in the projector 100 in advance and a focus adjustment value deviating from the standard range is set in the lens driving unit 154, the projection control unit 121 executes the focus adjustment during the start of the distortion correction processing. In this example, there is an advantage that it is possible to promptly discriminate whether the focus adjustment is performed.

Modification 3

When the focus adjustment value set in the lens driving unit 154 is not within the range set in advance, the projection control unit 121 may execute the focus adjustment (steps S36 and S37) on the basis of a focus adjustment value set in advance. In this example, it is possible to execute the focus adjustment without performing the processing for calculating a projection distance. Therefore, there is an advantage that it is possible to further increase the speed of the distortion correction processing. Further, there is an advantage that it is possible to promptly discriminate whether the focus adjustment is performed.

Modification 4

The projection control unit 121 may execute the focus adjustment (steps S36 and S37) on the basis of the focus adjustment value set in advance irrespective of the focus adjustment value set in the lens driving unit 154. In this example, it is possible to execute the focus adjustment without performing the processing for calculating a projection distance. Therefore, there is an advantage that it is possible to further increase the speed of the distortion correction processing. Further, since it is not discriminated whether the focus adjustment is performed, it is possible to more quickly perform the distortion correction processing.

The embodiment explained above is only an example of a specific mode to which the invention is applied. The embodiment does not limit the invention. The invention can also be applied as a mode different from the embodiment. For example, in the example explained in the embodiment, the image input to the A/D conversion unit 110 via the cable 200 is projected. However, the invention is not limited to this. It is also naturally possible to apply the invention when an image or a video stored in the image storing unit 171 is projected. Setting values concerning times, thresholds, and the like for defining the operations of the units of the projector 100 in the embodiment are stored in the ROM 170 in advance. However, the setting values may be stored in a storage medium or a device on the outside of the projector 100 and acquired by the projector 100 according to necessity. The setting values may be input every time the remote controller 191 or the operation unit 195 is operated.

In the embodiment, the processing for correcting trapezoidal distortion that occurs in an image on the screen SC is explained. However, the invention is not limited to this. For example, the invention can also be applied to, for example, processing for correcting distortion called barrel distortion or pin-cushion distortion.

In the explanation in the embodiment, the image pickup unit 180 includes the CCD camera 181 including a CCD image sensor. However, the invention is not limited to this. A CMOS sensor may be used as the image sensor of the image pickup unit 180. In the embodiment, the configuration including the three transmissive or reflective liquid crystal panels corresponding to the respective colors of RGB is explained as the example of the light modulation device. However, the invention is not limited to this. For example, the light modulation device may be configured by a system in which one liquid crystal panel and a color wheel are combined, a system in which three digital mirror devices (DMDs) that modulate the color lights of the RGB colors are used, or a system in which one digital mirror device and a color wheel are combined. When only one liquid crystal panel or DMD is used as a display unit, a member equivalent to a combination optical system such as a cross-dichroic prism is unnecessary. Besides the liquid crystal panel or the DMD, a configuration capable of modulating light emitted by a light source can be adopted without problems. The functional units shown in FIG. 1 indicate the functional configuration of the projector 100. A specific embodiment of the functional units is not specifically limited. In other words, hardware individually corresponding to each of the functional units does not always necessary to be mounted. It is also naturally possible to adopt a configuration in which one processor executes a program to realize functions of a plurality of functional units. A part of the functions realized by software in the embodiment may be realized by hardware. Alternatively, apart of the functions realized by hardware may be realized by software.

REFERENCE SIGNS LIST

100 projector
101 projecting unit (projecting means)
120 CPU
121 projection control unit (correction controlling means, focus controlling means)
122 correction control unit
124 three-dimensional measurement unit
125 projection-angle calculating unit
126 focus-adjustment-value calculating unit (focus-adjustment-value calculating means)
130 light modulation device
131 processor for images
132 trapezoidal-distortion correcting unit (correcting means)
133 superimposition processing unit
134 light-modulation-device driving unit
150 projection optical system
154 lens driving unit (focus adjusting means)
170 ROM
172 correction-pattern storing unit
177 correction pattern (image for adjustment)
180 image pickup unit
185 motion detecting unit
191 remote controller
195 operation unit,
SC screen (projection surface)

The invention claimed is:

1. A projector comprising:
a projecting unit including a projection optical system and configured to project an image on a projection surface;
a focus adjusting unit configured to perform focus adjustment for the projection optical system;
an image pickup unit configured to photograph the projection surface;
a correcting unit configured to cause the projection unit to project an image for correction, cause the image pickup unit to photograph the image for correction projected and perform automatic distortion correction processing for correcting distortion of the image projected by the projecting unit based on the photographed image;
a correction control unit configured to cause the correcting unit to execute the automatic distortion correction processing a plurality of times until a completion condition for the automatic distortion correction processing holds after a start condition for the automatic distortion correction processing holds; and
a focus control unit configured to restrict the execution of the focus adjustment by the focus adjusting unit while the correction control unit causes the correcting unit to execute the automatic distortion correction processing a plurality of times,
the focus control unit causing the focus adjusting unit to execute the focus adjustment when the start condition for the automatic distortion correction processing holds and before the correction control unit causes the correcting unit to start the automatic distortion correction processing.

2. The projector according to claim 1, further comprising a focus-adjustment-value calculating unit configured to calculate a focus adjustment value for the projection optical system on the basis of a projection condition, wherein
the focus adjusting unit is configured to execute the focus adjustment according to the set focus adjustment value, and
when the focus adjustment value calculated by the focus-adjustment-value calculating unit when the automatic distortion correction processing is started by the correcting unit and a focus adjustment value previously set in the focus adjusting unit have a difference equal to or larger than a predetermined difference, the focus control unit sets, as a new focus adjustment value, the focus adjustment value calculated by the focus-adjustment-value calculating unit in the focus adjusting unit and causes the focus adjusting unit to execute the focus adjustment.

3. The projector according to claim 1, wherein the correction control unit causes the projecting unit to project an image for correction until the completion condition for the automatic distortion correction processing holds after the start condition for the automatic distortion correction processing holds, and the correcting unit corrects distortion of the image projected by the projecting unit on the basis of a state of the image for correction projected by the projecting unit.

4. The projector according to claim 1, wherein the correction control unit determines, on the basis of movement of the projector, whether the start condition for the automatic distortion correction processing holds and whether the completion condition for the automatic distortion correction processing holds.

5. A control method for a projector, the control method comprising:

controlling a projector including a projecting unit including a projection optical system, which projects an image on a projection surface, and configured to project the image on the projection surface, focus adjusting unit configured to perform focus adjustment for the projection optical system, and an image pickup unit configured to photograph the projection surface; and executing automatic distortion correction processing causing the projection unit to project an image for correction, causing the image pickup unit to photograph the image for correction projected, and for correcting distortion of the image projected by the projecting unit based on the photographed image a plurality of times until a completion condition for the automatic distortion correction processing holds after a start condition for the automatic distortion correction processing holds and restricting the execution of the focus adjustment for the projection optical system while the automatic distortion correction processing is executed a plurality of times.

* * * * *